Jan. 4, 1955 J. E. MURREN 2,698,600
LIVE STOCK FEEDING APPARATUS
Filed March 19, 1952 2 Sheets-Sheet 1

INVENTOR.
JOHN E. MURREN
BY
ATTORNEY.

Jan. 4, 1955          J. E. MURREN          2,698,600
LIVE STOCK FEEDING APPARATUS
Filed March 19, 1952          2 Sheets-Sheet 2
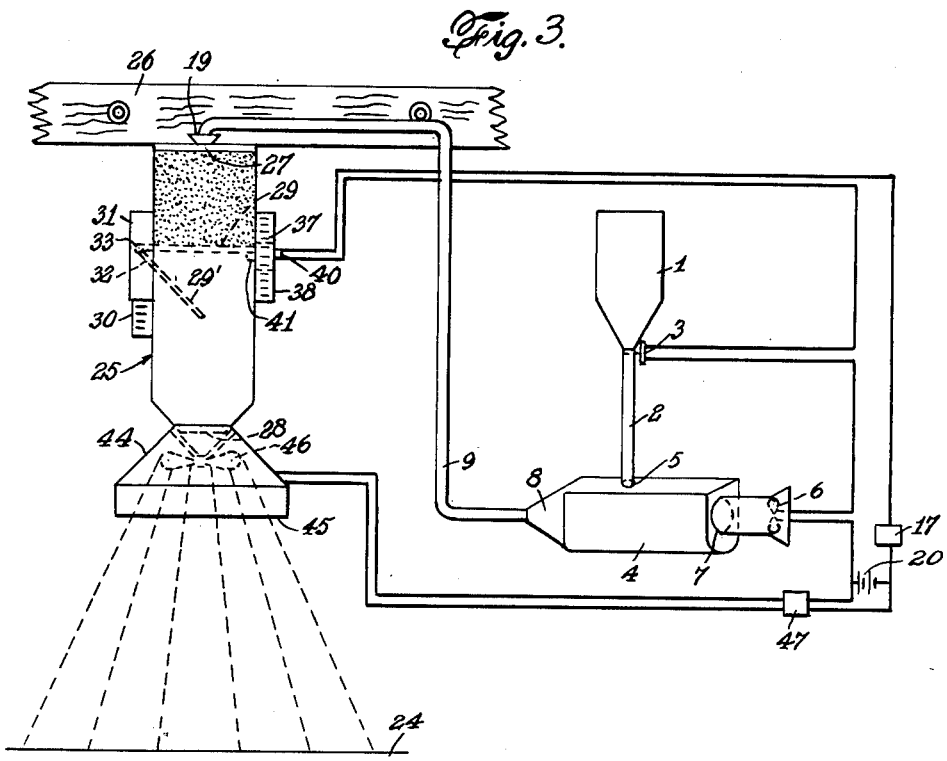
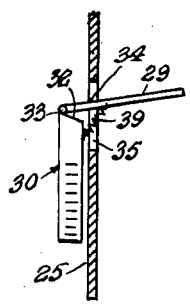
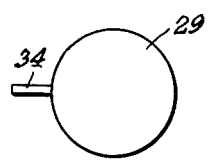
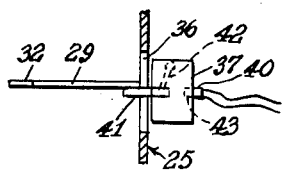
INVENTOR.
JOHN E. MURREN
BY
ATTORNEY.

United States Patent Office 2,698,600
Patented Jan. 4, 1955

2,698,600

LIVE STOCK FEEDING APPARATUS

John E. Murren, Neptune, N. J.

Application March 19, 1952, Serial No. 277,515

4 Claims. (Cl. 119—56)

The present invention deals with live stock feeding apparatus and more particularly with a grain feeding apparatus for poultry.

Controlled feeding of live stock and especially poultry is advantageous where the quality of the poultry is a prime consideration, and where a high egg output and substantially uniform egg weight and yolk color are desirable.

It is known that poultry, e. g. chickens, are somewhat individualistic in feeding habits and that the individual preference of each bird has a bearing on the egg sizes and color of the yolk.

Therefore, various poultry feeding mechanisms have been provided to feed the stock a certain quantity of a particular feed at certain time intervals in order to assure a diet balanced to bring out the desirable quality of poultry and the desirable egg production therefrom.

Such mechanisms generally comprise complex mechanical moving components and are also of a nature which necessitates substantial maintenance in order to insure operation at predetermined schedules.

Figure 1:
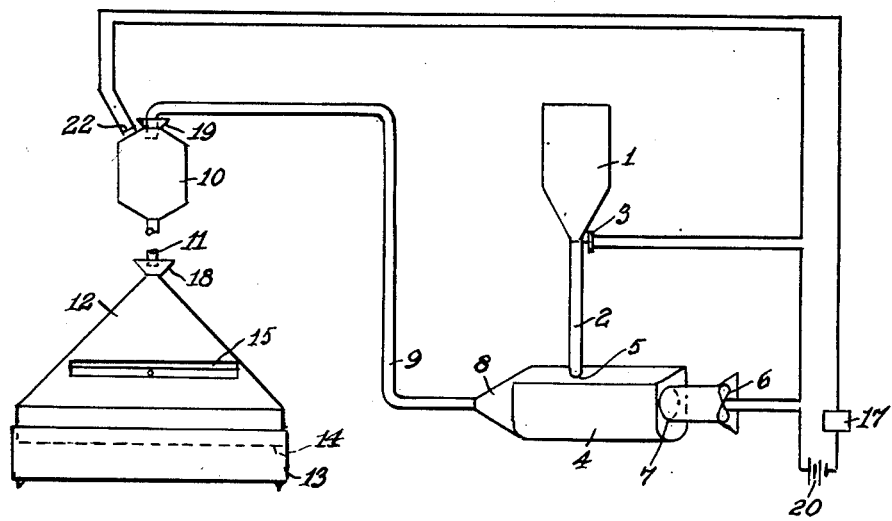
Figure 2:
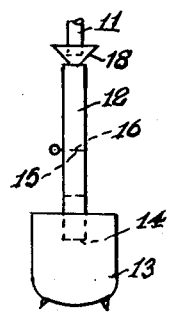

It is an object of the present invention to provide a live stock feeding apparatus for substantially fluid feed and which operates with a minimum of mechanical moving parts. It is another object of the present invention to provide a grain feeder for poultry which provides an adequate amount of grain at selective intervals or maintains an adequate amount of grain available for feeding. It is a further object of the present invention to provide a grain feeder for poultry which conveys the grain to a plurality of selective locations. Other objects and advantages of the invention will become apparent from the description hereinafter following and the drawings forming a part hereof, in which:

Fig. 1 illustrates a diagrammatic view of a conveying system according to this invention, Fig. 2 illustrates a side view of a part of the system on a slightly enlarged scale, Fig. 3 illustrates the system of Fig. 1 including a partially diagrammatic view of the particular hopper according to the invention, Fig. 4 illustrates a substantially central vertical sectional view of an indicator member shown in Fig. 3 but with the cover removed, Fig. 5 illustrates a top view of a disc member employed in the hopper of the invention, and Fig. 6 illustrates a substantially central vertical view of a disc support member as shown in Fig. 3 but with the cover removed.

The present invention deals with an apparatus for maintaining a supply of grain available in a feed trough or a plurality of feed troughs and whereby the grain is conveyed to the troughs through conduits over a substantial distance with a minimum of mechanical moving parts.

Figs. 1 and 2 illustrate the apparatus of my invention which comprises a main grain hopper or container 1 into which the grain is first introduced and which constitutes the grain supply for the apparatus. The hopper 1 is preferably elevated and leading downwardly therefrom is the conduit 2 having incorporated therewith a valve member 3, e. g. a solenoid operated valve member, said conduit leading to a blower chamber 4 through the aperture 5. A grain impelling means, e. g. a blower or fan 6, is associated with one end of the blower chamber 4, e. g. the blower 6 is operatively connected to an end of the blower through the aperture 7 or is otherwise contained by said chamber. A funnel member 8 is connected to the other or opposite end of the chamber and leading therefrom is the conduit 9, which leads preferably to a rafter or other elevated support above the floor of a poultry house and to a secondary elevated container or hopper 10. The secondary hopper 10 is employed under the conditions where a reserve supply of grain is desired so that the use of the blower member 6 may be employed only for extended intervals. Leading downwardly from the hopper 10 is a conduit 11 connected to the top portion of a feeder 12, which is narrower at its top portion and wider at its lower portion and its lower portion being insertable into the feed trough 13, e. g. the feeder may be a conduit of a substantially triangular shape having a base portion or outlet portion 14 of a length sufficient to correspond with the length of the feed trough and preferably of a length such that the outlet portion 14 is insertable into the trough 13 with its ends engageable with the ends of the feed trough.

The feeder 13 is provided with a removable retaining plate 15 between its upper and lower portions. The retaining plate is insertable into the feeder 12 through an opening 16 and is dimensioned to close the feeder to the passage of grain beyond the said plate.

In order to move grain or other substantially fluid feed from the main hopper 1 to the feed trough 13, or to a plurality of feed troughs through a plurality of conduit means, feeders, etc., which are similar to the single conveying apparatus illustrated leading the single feed trough, I provide an electrical circuit and a source of electrical current 20. The electrical circuit comprises a switch member 17 having serially connected therewith and with said source of current the solenoid valve 3 and the blower 6, whereby by means of said switch the solenoid valve is opened for the passage of grain into the conduit 2 and into the blower chamber 4. Simultaneously with the activation of said valve, the blower 6 is activated and blows the grain falling into the blower chamber into the conduit 9, through secondary hopper 10 and into the feeder 12 past the air outlet structure 18, which allows air from the blower 6 to be discharged therethrough while the solid particles will be retained in the system, e. g. similarly to the principle generally applied in vacuum cleaner bags, and to the retaining plate 15, which is in close position or locked position during the blowing operation. The upper portion of the secondary hopper 10 is provided with a similar air outlet member 19.

Upon initial passage of grain through the system only the air outlet member 18 and air outlet member 19 are in the open venting position whereby the grain is moved through the entire conduit system to the top of the feeder 12 from which position the grain falls into the feeder and against the retaining plate 15 in closed position. As the grain fills the feeder 12, the air outlet member 19 above the secondary hopper 10 still remains opened whereby the grain is moved into the said hopper. When the grain fills the secondary container or hopper 10, or only the feeder 12 if so desired, the switch 17 is opened and the solenoid valve 3 and blower 6 are simultaneously deactivated.

For automatically deactivating the blower 6 and valve 3, I may provide the switch 17 as a time switch to open after a predetermined period, or I may provide switch means 22 either in the hopper 10 or feeder 12 and in series connection with the blower 6 and valve 3 and operative to open the energizing circuit when the feed substantially fills the hopper 10, or feeder 12, if so desired.

When either the feeder 12 or feeder 12 and hopper 10 are filled and blower deactivated, I need only unlock or remove the retaining plate 15 to allow the feed to fall into the trough 13 and thereafter close or insert the retaining plate 13. When the volume of feed below the retaining plate is consumed, I may again reopen the feeder, etc., until it again becomes necessary to refill the feeder or hopper 10 by reactivating the electrical circuit.

Fig. 3 illustrates a preferred modification of the present invention and Figs. 4, 5, and 6 illustrate particular components of the said modification.

In feeding grain to chickens, the grain is preferably deposited on the floor 24 of the chicken house whereby the chickens may feed in a natural manner, e. g. by scratching for the grain. Therefore, I dispense with the feeder 12 and feed trough 13 and substitute a particular secondary grain hopper 25 for the hopper 10, said hopper 25 being elevated above the floor 24 and secured to a chicken house rafter 26, or other elevated support therefor.

The hopper 25 is preferably a cylindrical substantially vertical container having an inlet 27 and constricted outlet 28, said outlet being below said inlet, and said hopper containing an adjustable plate member, or retaining disc 29, vertically adjustable in accordance with the amount or volume of grain I may choose to dispense at selective intervals. In order to accomplish the dispensing of the grain in a predetermined amount, I provide a weight or volume indicator 30 calibrated in accordance with the volume of said hopper 25. The weight indicator is a vertically slidably or adjustable disc supporting member in a weight or volume indicator housing 31, which housing is secured to the side of the hopper 25 and the indicator has an upper end face 32 beveled to slant downwardly in the direction of said hopper when said indicator is vertically positioned against the wall of the hopper. The uppermost portion of said face 32 is provided with a hinge 33 to which is secured an arm or tab 34 connected to the disc 29. While the disc or retaining plate 29 is positioned within said hopper, the said indicator 30 is positioned outside of said hopper and the said tab 34 connected to the hinge 33 rides vertically in a vertical slot 35 through the wall of said hopper and covered by said housing 31 so that by means of said tab in the slot the plate 29 is capable of opening or closing the passage of grain through said hopper, e. g. when the tab 32 is parallel with the said slanted face 32 the hopper is in maximum open position to the passage of grain therethrough as illustrated by the position 29' of plate 29 in Fig. 3.

Diametrically opposite the slot 35, I provide another slot 36 through the wall of the hopper 25. A retaining disc guide member 37 is slidably adjustable or vertically movable along said slot and on the outer wall of said hopper 25. A calibrated guide housing 38 is provided for said guide 37.

When I choose to dispense, for example, fifty pounds of grain, I vertically move the indicator 30 to a calibrated fifty pound mark, which sets the retaining plate 29 at a position within the said hopper above which is a volume space capable of holding fifty pounds of grain. I then move the guide 37 to a fifty pound calibration mark and set this guide substantially similarly to the setting of the indicator 30. In an empty hopper, the thrust spring 39, connected to said indicator and said tab, holds the retaining plate in closed position and spaced from the slanted or beveled surface 32. The thrust spring 39 is balanced to hold only the plate 29 in such position and the weight of grain upon said plate will cause the said tab to contact the slanted face with the plate in open position. Having set the indicator and guide as above set forth, I activate the conveying system and simultaneously the electrical contact 40, which is an electrical series connection with the activating conveyor circuit, whereby a tongue member or retaining disc support 41 contained within the guide 37 is caused to move inwardly of said hopper 25, e. g. by means of the arm 42, and through the slot 36 into the hopper at a location therein diametrically opposite the hinge 33 whereupon the said plate 29 is held in closed or horizontal position and supports the grain deposited against the upper face of the retaining plate. It is, of course, apparent that I may automatically activate and deactivate the contact 40 and the conveying circuit by means of timer switch 17, whereby, during the time that the hopper 25 is empty, the plate 29 automatically assumes the substantially horizontal position and the contact 40 is connected to an electromagnet 43 and is subsequently activated at predetermined periods. The said contact 40 is electrically connected to the electromagnetic member 43 operable to release the support 41 out of engagement with the said disc 29 when the contact 40 is deactivated.

About the outlet 28 of the hopper 25, I provide an inverted funnel-shaped member, or an inverted frustoconical hover 44 having preferably a non-circular or rectangular shaped opening 45. Within the said hover 44 I position a supported horizontally rotatable member, e. g. a centrifuge member or fan 46, whereupon, when the grain is caused to fall to the bottom of the hopper and passes or flows out of the constricted opening 28, at least a substantial amount of the discharged grain is caused to be centrifuged or directed against the inner surface of the hover 44 by the fan 46. The amount of grain contacting the fan 46 will be directed downwardly by the said inner surface of the hover to form a bed of grain on the floor 24 corresponding in shape to the outlet shape of the hover opening but substantially enlarged in comparison therewith and the size of the bed of grain depending upon the distance of the hover from the said floor. I can, therefore, provide a bed of grain dimensioned and shaped as desired and determined by the type of grain bed best suited for a particular type chicken house.

In order to activate the said centrifuge member or fan member 46, I provide either a manually operated switch or a timer switch 47 operative during the discharging time of the grain and connected in the fan activating circuit connected from a source of current 20 to the said fan.

The feeding apparatus of the present invention may be set to feed any sized flock of chickens in accordance with the volume set in hopper 25. For example, a timer mechanism such as a time switch 17 and time switch 47 are set to operate the feeder at four o'clock each day. The farmer may therefore remain away from the chicken houses for a week-end by setting the timers at a prescribed feeding time, e. g. four o'clock on a Saturday afternoon, and after such feeding he refills the grain containers so that the apparatus may automatically take care of the Sunday feeding and whereby another refilling of the containers may be accomplished before the feeding time on the following Monday.

What I claim is:

1. Apparatus for dispensing grain, comprising a container having an inlet in an upper portion thereof and an outlet at the bottom thereof, a funnel-shaped member having its smaller end portion encompassing said outlet, a horizontal rotatable member supported within said funnel-shaped member below said outlet, a pair of diametrically opposite vertical slots through the wall of said container, a vertically adjustable plate member within said container, said plate member having an arm passing through one of said slots, a first adjustable member slidable along one of said slots on the outer wall of said container, said arm being pivotally secured to said adjustable member, a second adjustable member slidable along said other slot on the outer wall of said container, said second adjustable member having a tongue member movable inwardly and outwardly of said container through said other slot whereby said tongue member is engageable with said plate member and operative to support said plate member, means operably associated with said tongue for moving said tongue member inwardly and outwardly of said container, and means operably associated with said rotatable member for rotating said rotatable member.

2. Apparatus according to claim 1, wherein the larger opening of said funnel-shaped member is of an non-circular shape and whereby grain directed against the inner surface of said funnel-shaped member by the rotatable movement of said rotatable member is caused to be deposited on a surface below said funnel-shaped member in a non-circular pattern.

3. Apparatus according to claim 1, wherein said first adjustable member is calibrated according to the volume of said container and whereby its setting along said slot indicates the setting of the plate member within the said container and the volume in said container above said plate member.

4. Apparatus according to claim 1, wherein said plate member is positioned horizontally within said container, said first adjustable member having an upper end face slanted in the direction of said slot, the uppermost portion of said slanted face having said arm pivotally secured thereto, means for maintaining said arm upwardly spaced from said slanted face when the space above said plate is free of grain.

References Cited in the file of this patent

UNITED STATES PATENTS

| Number | Name | Date |
|---|---|---|
| 760,482 | Ray et al. | May 24, 1904 |
| 1,033,865 | Bernert | July 30, 1912 |
| 1,239,404 | Knoll, Jr. | Sept. 4, 1917 |

(Other references on following page)

UNITED STATES PATENTS

| | | |
|---|---|---|
| 1,355,399 | Kelley | Oct. 12, 1920 |
| 1,359,691 | Genuit | Nov. 23, 1920 |
| 1,412,031 | Vallentyne | Apr. 4, 1922 |
| 1,465,269 | Horn et al. | Aug. 21, 1923 |
| 1,571,814 | Stewart | Feb. 2, 1926 |
| 1,645,460 | Spain | Oct. 11, 1927 |
| 1,943,376 | Dilling | Jan. 16, 1934 |
| 2,314,109 | Smith | Mar. 16, 1943 |
| 2,598,977 | Dale | June 3, 1952 |